UNITED STATES PATENT OFFICE.

EMIL RUEFF, OF NEW YORK, N. Y.

PROCESS OF MAKING LIGHT BASIC MAGNESIUM CARBONATE.

SPECIFICATION forming part of Letters Patent No. 534,177, dated February 12, 1895.

Application filed January 25, 1894. Serial No. 498,032. (No specimens.)

*To all whom it may concern:*

Be it known that I, EMIL RUEFF, a citizen of the United States, residing at New York, in the county and State of New York, have invented new and useful Improvements in Processes of Manufacturing Light Basic Carbonate of Magnesia, of which the following is a specification.

This invention relates to a process of manufacturing light carbonate of magnesia known in chemical language as hydrated basic carbonate of magnesia, in a simple and economical manner.

The following is an example in which my invention can be carried out. The parts are by weight. Mix one part of magnesia (MgO) with twenty-five parts of water and conduct to such mixture carbonic acid gas under agitation until the mixture has absorbed from one (1) to one and two tenths (1.2) parts by weight of the carbonic acid gas. In order to facilitate the absorption of the gas, the mixture is kept at a moderate temperature say not above 20° centigrade. An additional quantity of water is added to this mixture and the whole is boiled for about one hour, when a light basic carbonate of magnesia is produced which may be represented by the following formulas:

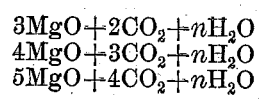

$$3MgO + 2CO_2 + nH_2O$$
$$4MgO + 3CO_2 + nH_2O$$
$$5MgO + 4CO_2 + nH_2O$$

What I claim as new, and desire to secure by Letters Patent, is—

The within described process of producing light carbonate of magnesia which process consists in forming a mixture of magnesia and water in about the proportion of one part by weight of magnesia to twenty-five parts of water, then exposing this mixture to the action of carbonic acid gas until about one part by weight of carbonic acid gas has been absorbed and finally boiling the mixture substantially as described.

In testimony whereof I have hereunto set my hand in the presence of two subscribing witnesses.

EMIL RUEFF.

Witnesses:
WM. C. HAUFF,
E. F. KASTENHUBER.